(12) United States Patent
Rosenbluth et al.

(10) Patent No.: US 8,654,136 B1
(45) Date of Patent: Feb. 18, 2014

(54) MEMORY PAGING SYSTEM FOR REAL TIME MOTION DATA RECORDING, EDITING, AND PLAYBACK

(76) Inventors: Steve Rosenbluth, Burbank, CA (US);
Hermann Chong, Burbank, CA (US);
Peter Tipton, Pasadena, CA (US);
Steven Sandoval, North Hollywood, CA (US)

(*) Notice: Subject to any disclaimer, the term of this patent is extended or adjusted under 35 U.S.C. 154(b) by 534 days.

(21) Appl. No.: 13/030,452

(22) Filed: Feb. 18, 2011

Related U.S. Application Data

(60) Provisional application No. 61/338,509, filed on Feb. 19, 2010.

(51) Int. Cl.
*G06F 15/167* (2006.01)
*G09G 5/36* (2006.01)
*G06F 13/28* (2006.01)

(52) U.S. Cl.
USPC ............................ 345/541; 345/547; 345/570

(58) Field of Classification Search
CPC .......... G09G 5/363; G09G 5/393; G09G 5/39
USPC ......................................... 345/541, 547, 570
See application file for complete search history.

(56) References Cited

U.S. PATENT DOCUMENTS

| | | | |
|---|---|---|---|
| 7,769,970 B1 * | 8/2010 | Yeh et al. | 711/158 |
| 2010/0174872 A1 * | 7/2010 | Baxter et al. | 711/147 |

* cited by examiner

*Primary Examiner* — Hau Nguyen
(74) *Attorney, Agent, or Firm* — Roy L. Anderson; Wagner, Anderson & Bright, P.C.

(57) ABSTRACT

A system and method of capturing, storing, editing and outputting multi-track motion data in a continuous stream on a computer with deterministic timing, where the length of the motion dataset is not limited by computer Random Access Memory. A hard real time periodic motion task takes in data streams from sensors or other computers, stores it in a shared memory area, and streams out the data to other computers so as to actuate motion. A shared memory area stores buffers and flags which indicate what data should be swapped to and from persistent storage. A soft real time periodic task transfers data pages between RAM and persistent storage based on requests from the motion task. Three data pages surround the active point in the motion dataset, four pages are reserved for copying whole blocks of data, and three pages are reserved for data editing. These ten active memory pages define a fixed memory footprint which can handle a deterministic data stream of effectively infinite length. The systems periodic data output can be triggered instantaneously or locked in synchronization with other hard real time equipment such that data is never lost or transmitted late. The system may capture data, control robotic mechanisms, or stream motion via a network into the graphics or data capture environments of other computers.

11 Claims, 5 Drawing Sheets

MEMORY PAGING SYSTEM FOR REAL TIME MOTION DATA RECORDING, EDITING, AND PLAYBACK

CROSS REFERENCE TO RELATED APPLICATIONS

This application is a continuation in part from U.S. Ser. No. 61/338,509, filed Feb. 19, 2010, titled Memory Paging System for Hard Real Time Data Recording and Playback, the disclosure of which is specifically incorporated herein by reference

FIELD OF THE INVENTION

The invention generally relates to data processing. The invention relates more specifically to computer software and systems used in the capture of telemetry data and the control of robotic motion and computer graphic animation used in live events or motion picture production.

BACKGROUND OF THE INVENTION

Computerized motion control and motion capture are often used in industrial and entertainment applications where time-critical computer programming techniques are used and deterministic hard real time operating systems are utilized. Pre-recorded motion can be played back to electro-mechanical actuators in a highly accurate periodic stream so as to move robotic devices, or alternatively motion can be sent into computers which move computer graphic models on a screen. Live streaming motion from sensors or input devices can also be sent into such systems so that objects are actuated in-the-moment as a live performance.

Electronic transducers are used as input devices to such motion systems; they measure and convert real-world movement such as position or velocity to a digitized form readable by computer software. A motion system may take in a stream of such data over time from another computer where the motion has been synthesized by a person using software tools, or the motion may have originated at electronic transducers measuring real world motion.

Typically both capture and playback of recorded motion datasets is required of motion systems. The "Non-linear editor" is common in computer programs which represent multiple tracks of data over time, such a facility can record, edit, and play back motion datasets.

Frame rates of 24 to 200 frames per second are typical in live motion systems and that frame-rate must not jitter by more than a few tens of microseconds or the job fails in some way. In a deterministic hard real time environment, periodic invocation or "frame-rate", can be guaranteed by design. In electromechanical actuation, excessive timing jitter causes high frequency accelerations and vibrations which adversely affect the quality of motion, causing undesired movement or even damage to equipment. If such jitter is allowed in a live-action or film-making environment, the quality of motion would appear visually noncontinuous, rendering any recording unusable in a live-action performance environment such jitter would cause a poor aesthetic quality of motion.

The difference between "hard" and "soft" real time is not Speed but Determinism. In this case Determinism means a set of timing and scheduling guarantees provided by operating system architecture. A "Task" in a real time computer system may be either a Program or a Thread of a program which can be independently scheduled to run by the operating system. A computer Operating System which is "Hard Real Time" is one where the operating system architecture provides a Task Scheduler that achieves the following:

Guaranteed execution of critical Tasks at a known time, or at a known periodic rate
  An upper bound on the latency in Task scheduling and event handling
  Guaranteed Task prioritization
  A guarantee that preemption of a running critical task will not occur Such operating systems are called Deterministic because the timing of tasks can be precisely determined and controlled. Desktop operating systems such as Windows®, MacOS®, or Linux® implement task scheduling architecture which has the differing goal of making execution time available to processes equally. Thus, these environments cannot meet all of the above real time requirements. Such operating systems can attempt to schedule tasks to execute at known times in the average case, but their worst-case timing errors are not bounded. Such environments are non-deterministic and only capable of what is called "Soft Real Time".

To solve timing problems in live streaming motion systems, the traditional approach has been to use Hard Real Time operating systems and their task scheduling techniques. One limitation of Hard Real Time systems though is that they typically cannot utilize high capacity persistent storage such as hard disk drives because of device access timing delays which would ruin real time performance. Such systems thus keep all active data in Random Access Memory ("RAM"). This approach has the drawback of limiting the amount of data recording or playback time available, as there is normally only a small amount of RAM in a computer relative to the potential size of multi-track streaming motion datasets.

Soft Real Time systems, on the other hand, use hard-disk recording and playback techniques to access large datasets but cannot guarantee low latency triggering of events or accurate periodic timing because their tasks may be interrupted or delayed by the operating system. Such systems experience occasional data underflow, where data is not available, and cannot reliably stay in sync or lock their timing to an external time-base. These shortcomings give such systems serious limitations in live motion environments like stage productions, sporting events, or motion picture and TV production.

To solve the problem of running out of memory, many desktop Operating Systems implement "Virtual Memory" systems which use a "paging" approach to supply more memory than physically exists. The purpose of this virtual memory is to prevent the Operating System and its applications from halting when RAM runs out. This is done by augmenting physical memory with memory emulation on a persistent storage medium like a hard drive. Though such virtual memory systems implement on-demand memory for applications which request it, applications must "block" and wait while data is moved from RAM to persistent storage and vice-versa. The operating system may also be busy performing other tasks when virtual memory is needed. Thus traditional virtual memory systems yield significant slowdowns in application performance, the problem being exacerbated by the fact that the Operating System does not know what data will be used ahead of time. In summary, Operating System virtual memory paging makes computer programs susceptible to stalling whether memory is accessed linearly or in a random-access fashion.

Application programs themselves do have more knowledge of how they will use their own data and some, notably multimedia applications, implement their own "paging" systems to handle large linear datasets. This helps prevent the stalling which would occur if the operating system alone were relied upon. Such multimedia applications are sufficient for some soft real time jobs but still have three significant drawbacks:

- They are susceptible to stalling during random-access of their datasets
- They are susceptible to timing jitter during playback or recording of a linear dataset
- They cannot start a capture or playback without Buffering which causes triggering latency Thus, there is a need for a system that avoids these drawbacks, especially for large linear datasets.

SUMMARY OF THE INVENTION

The present invention is generally directed to a system maintained in a computer for capturing and streaming live motion datasets with deterministic timing using a series of in-memory data Pages within which a point of data playback or a point of data capture can seek with deterministic timing, a shared memory area which both deterministic real time and non real time tasks can access, a linear Page Table in the shared memory area with one element per time-slice, where Flags in the Page Table convey memory-swapping requests and statuses, a prioritized Page Queue in the shared memory area utilizing the mechanism of a linked list to connect elements of the Page Table in a Least-Recently-Used order, a persistent mass storage device with a hot-swappable physical media to which data is stored in fixed size Pages, a deterministically scheduled software Motion Task which takes live input of a plurality of digitized channels of motion and outputs the plurality of digitized channels of motion in a communications stream, a non-deterministically scheduled software Paging Task which manipulates blocks of data as Pages, moving data between the shared memory area and the persistent memory storage so as to pre-fetch data before it is needed by the Motion Task, and a software Graphical Task which portrays a motion time-line and allows a user to capture or play back multiple channels of motion.

The system of the present invention can be used for capturing, storing, and outputting a stream of multi-track motion data with deterministic timing with a computer by using a hard real time software Motion Task to capture and play back periodic data in a motion dataset of a stream of multi-track motion data and manage data paging requests for data contained in a series of in-memory data Pages, using a soft real time software Paging Task to swap data to and from a shared memory area of the computer and a persistent storage memory device based on the data paging requests, and keeping critical data Pages in the shared memory area with at least one locking software Task which identifies typical usage cases and means for pre-fetching data Pages into a shared memory area from the series of data Pages in a persistent mass storage device for the Motion Task to use such that the motion dataset is not limited by the shared memory area and editing and data capture may be performed concurrently.

In a first, separate group of aspects of the present invention, the Motion Task manages requests for blocks of the in-memory data Pages without the possibility of being preempted by another process, each Page Table element represents tens of seconds worth of data and data is swapped out to the persistent storage in pages indexed by a 64 bit number so as to remove practical limitations on the length of the dataset and the data on the persistent mass storage device is indexed by a 64 bit number such that there is no practical limitation on the length of the dataset and the Paging Task moves data to and from the persistent storage within a sufficient time frame such that it allows deterministic and uninterrupted data flow through the Motion Task.

In a second, separate group of aspects of the present invention, the graphical dataset editing operations are conducted on the in-memory pages such that data access during editing normally does not have to wait on the in-memory pages to be loaded from the persistent storage.

In a third, separate group of aspects of the present invention, the Motion Task is presented with a continuous dataset accessed via a small, fixed memory area, achieving deterministic multichannel data streaming effectively unlimited by the size of system memory and ten loaded pages are kept in RAM at all times of which three pages are for a current, a next, and a previous data buffer, four pages are for block data copies, two of said four pages being for beginning of a copied section and two of said four pages being for the end of the copied section, and three pages are for editing operations.

In a fourth, separate group of aspects of the present invention, the system is capable of being electrically synchronized to an external pacing signal so as to stay in step with other equipment, non-motion data can be streamed into the system, captured, and streamed out of the system, motion is streamed to or from a second computer where the data can be either captured or displayed graphically and the shared memory area is stored in random access memory and the computer displays a limited quantity of a low-resolution version of swapped-out data so as to represent said swapped-out data graphically to the user.

It is therefore an object of the present invention to provide an improved system and method for the capture of telemetry data and the control of robotic motion and computer graphic animation used in live events or motion picture production.

These and further objects and advantages will be apparent to those skilled in the art in connection with the drawings and the detailed description of the invention set forth below.

DETAILED DESCRIPTION OF THE INVENTION

If the data usage-cases of a computer application program are known then the problems of random-access and linear stalling can be solved with soft real time data "pre-fetch" algorithms. The problems of timing jitter and triggering latency can additionally be solved with deterministic hard real time architecture. A solution to the most common problems of capturing, editing and playing large multi-track motion datasets in live-action motion environments can be found in the combination of hard real time periodic task architecture with soft real time memory paging algorithms.

The present invention achieves the solution to the data streaming problems above by combining a hard real time software Motion Task which captures and plays back periodic data and manages data paging requests, a soft real time software Paging Task which swaps data to and from persistent storage based on page load requests, a shared memory area containing pages of in-RAM data, a page-table, and a priority queue.

Critical pages of data are kept in memory with locking algorithms which identify typical usage cases. Available pages are kept in a "Least Recently Used" queue which is managed by the Paging task.

A non real time task like the Graphical User Interface or the real time Motion Task itself request pages of data based on look-ahead algorithms, while the Paging task pre-fetches data in time for the Motion Task to use.

The present invention provides a system and a method of capturing, storing, and outputting a stream of multi-track motion data with deterministic timing with a computer where the length of the motion dataset is not limited by computer RAM and editing and data capture may be performed concurrently.

Figure 1:
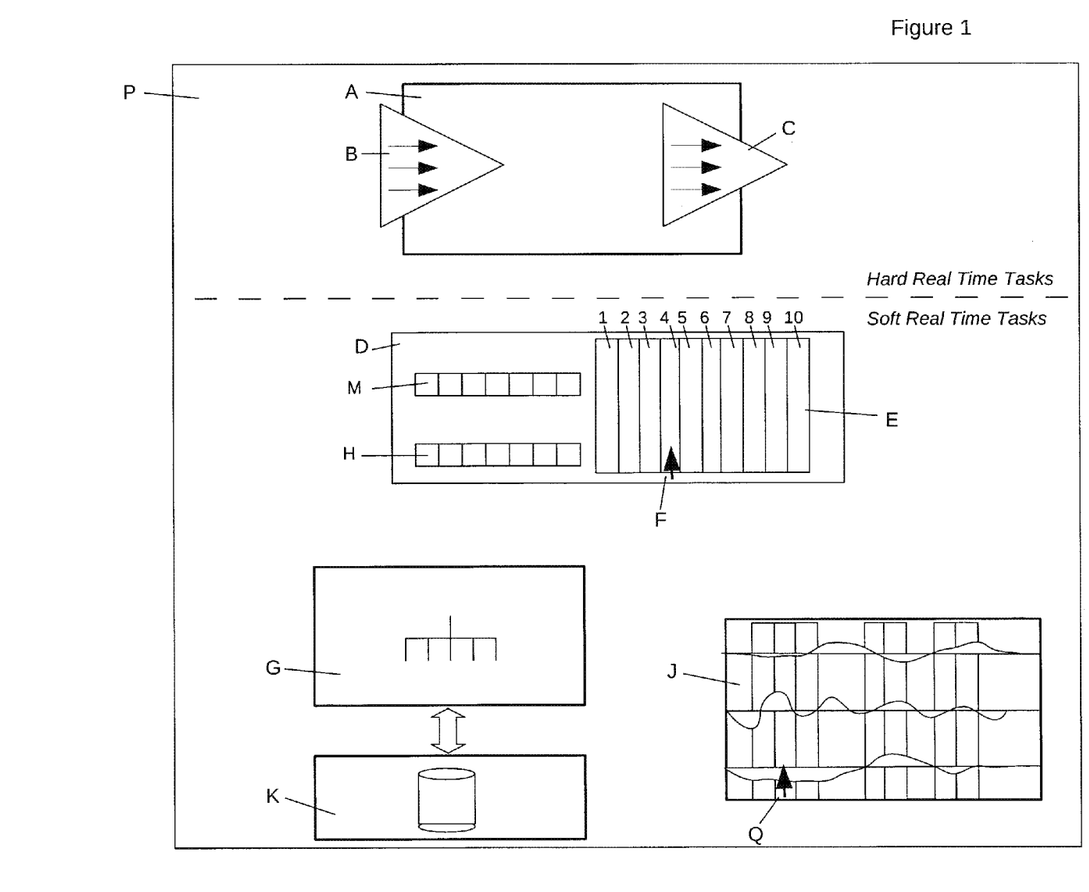
FIG. 1 depicts the software architecture of the invention including operating system tasks, memory usage and data structures.

An especially preferred embodiment of the present invention is comprised of the following elements that are depicted in FIG. 1:

1. A hard real time software Motion Task A capable of streaming data to and from other computers continuously, paced by a deterministic periodic scheduler of the operating system; running on a computer comprised of a central processing unit, random access memory and persistent storage.
2. A shared data memory area D which contains RAM pages E, flags H, a priority queue M, and messaging flags in a Page-Table H indicating that data should be swapped to and from persistent storage.
3. A soft real time periodic software Paging Task G which transfers data in units of Pages between the shared memory area and persistent storage K such as a hard drive, based on requests from the Motion Task in such a manner as to pre-load data before it is needed.
4. A Graphical User Interface software Task J which views the shared memory area and presents a graphical non-linear editor ("NLE"). The NLE displays a "run-marker" Q which is analogous to the pointer F in the shared memory area, the run-marker Q being the current position in the dataset for recording or playback.
5. A hard real time computer Operating System capable of scheduling periodic tasks deterministically, in the program space P of which the Tasks reside.

In the preferred embodiment of the invention each Task above is a software Program but alternative embodiments could implement multiple software Threads instead.

A memory-swapping algorithm in the Paging Task G utilizes sortable buffers, or Pages, which can be re-prioritized and loaded with data, in order to represent different portions of the dataset. Three data pages surround the active point in the dataset, four pages are reserved for copying whole blocks of data, and three pages for curve editing add up to a total of ten active memory pages. The ten pages comprise a fixed memory footprint which contains the "active" portions of the dataset.

Despite the fact that the live motion dataset does not reside in RAM all at once, the NLE run-marker Q experiences a continuous dataset as it steps forward such that there are never delays in the flow of data into or out of the system during playback or recording. Though only a portion of the motion dataset resides in RAM at once, the potential length of the dataset is effectively unlimited provided large index variables and hot-swappable persistent storage drives are used. Thus the invention solves the problem of the disparate goals of having both deterministic task timing and motion datasets of great length.

In the preferred embodiment of the invention, the data page-table structure itself is swapped to and from persistent storage such that there is no RAM limitation on the number of elements in the data page-table structure or on the length of the motion dataset. Using 64 bit page-table indexes and thirty second pages allows the application to access a dataset over 17 trillion years in length.

The system of the preferred embodiment operates on multi-track motion data such as that captured by input sensors. The system is capable of capturing motion datasets controlling mechanisms, or streaming motion via a network into the data capture or graphics environments of other computers. All of the algorithms are executed Live at the clocked system frame-rate such that there is no buffering of data which would cause undesired latency in triggering the recording or playback of data. The entire dataset may be pre-recorded and fixed, such as for a limited three hour performance period, or data could be incoming over a long period of time approaching an infinite set. Accordingly the invention is keyed to a non-fixed streaming dataset. The multitrack motion data will hereinafter be referred to as the Dataset.

The operating system schedules Motion Task A to execute repeatedly via the operating system's periodic hard real time clock. When it runs, Motion Task A moves motion data periodically and the flow of that data may take more than one path through the system. Live Motion flows into input stage B and is either streamed to Output stage C, or stored in the data pages E as a recording. Motion can be retrieved from data pages E and sent to output stage C as Playback data.

Paging Task G watches flags which the Motion Task A sets in the shared memory page-table H and the Paging Task loads or unloads data pages E to and from memory accordingly. This insures that the current playback pointer F will always be on a valid page.

In FIG. 2 through FIG. 8, Data Page-table H (from FIG. 1) is shown as an array where each element is a container of variables which describe properties of a fixed-width slice of time. Those sequential time-slices have the potential to contain a page of motion data. Each element has a variable which can point to an actual data page E, or it can point to nothing, indicating that data is swapped-out to persistent storage for that slice of time. Data Page-table H has no upper limit on its size, as it can expand as the size of hot-swappable persistent storage expands. The Least Recently Used ("LRU") queue M links each unlocked RAM data page E in a prioritized order. Pages at the "top" of the queue, to the left, are most-used and those at the "bottom" of the queue, to the right, are least used. Pages naturally shift to the bottom because in-use pages are pushed to the top by the prioritization algorithm. The LRU queue M is a bidirectional linked list which points elements to the page-table to one another. Each element of the LRU queue may have the following attributes:

Page Requested to be used

Page Uninitialized

Priority, where the top of the queue contains the most recently used pages

Only unlocked pages go into the LRU queue. Locked means a page is currently in-use or likely to be used and should not be removed. Unlocked means the page is available because it was previously in-use and is still swapped into RAM, yet it is not considered critical and thus may be re-used. The Requested state is temporary but necessary to prevent two tasks from requesting the same page at the same time. Paging request must be fulfilled by the Paging Task, which takes a period of time. A race-condition between two requests might occur during that time if not for the Requested state, which is a flag managed by the Motion Task that prevents the race-condition. Uninitialized state occurs only at the start of the algorithm or after a reset of the algorithm.

Figure 2:
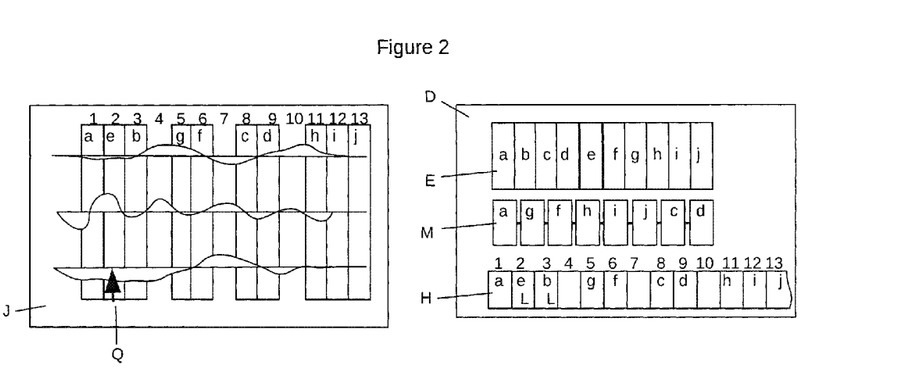
FIGS. 2-8 each depict a matched pair of GUI state and corresponding RAM Data Structure state, as implemented by the invention. Each pair demonstrates a different user operation and the resultant effects on GUI and Data Structures.

A look-ahead algorithm pre-loads ten pages E into RAM (see FIG. 2). A diagram containing these pages is seen in the Graphical User Interface ("GUI") view J of FIG. 2 in:
Current page, used by the run-marker (page "e")
Next page, for Playing and mouse dragging of the run-marker (page "b")
Previous page, for GUI scrubbing (page "a")
Two pages for the beginning of a copy region, if a copy operation occurs (pages "g","f")
Two pages for the end of a copy region, if a copy operation occurs (pages "c","d")
Also loaded during the looping of playback are:
Three pages at the start of the dataset for editing operations such as curve smoothing The GUI depictions J in FIGS. 2 through 8 show NLE time-slices 1 through 13 filed with pages "a" through "j". This algorithmic information is hidden in the GUI of the preferred embodiment, where only tracks of motion data and a run-marker Q are visible. The time-slices and pages are shown here in order to depict page usage during the course of the algorithm for ease of understanding of the present invention. Also, for ease of reference hereinafter, the number of the Figure being reference will appear in front of the particular item of the Figure being discussed. Thus, for example, Paging tables H and M in FIG. 2 will be referred to as 2H and 2M.

The system Paging tables 2H and 2M and the ten in-RAM pages 2E reside in shared memory 2D. The ten pages 2E labeled "a-j", are referenced in both the page-tables 2H and the GUI view 2J. The pages are typically in a random order in 2H and 2J due to previous prioritization and use. In FIG. 2M, pages "a,g,f,h,i,j,c,d" are seen in the LRU queue as they are available for re-use. Page "e" is Locked and absent from the LRU queue because the run-marker 2Q is currently using that page. Similarly, page "b" is Locked and absent from the LRU queue since it is the Next page in time and adjacent to "e".

In the GUI view of FIG. 2J, the run-marker 2Q is moved by the hard real time Motion Task so as to maintain the determinism of the flow through the system. The Motion Task makes a request via a flag in page-table 2H that the soft real time Paging Task modify the page-tables 2H and 2M in shared memory 2D. The Paging Task copies data to and from persistent storage to in-memory pages 2E so as to service the requests for data from the Motion Task. The GUI may also request pages of data via a flag in page-table 2H depending on what operation the user is performing.

Figure 3:
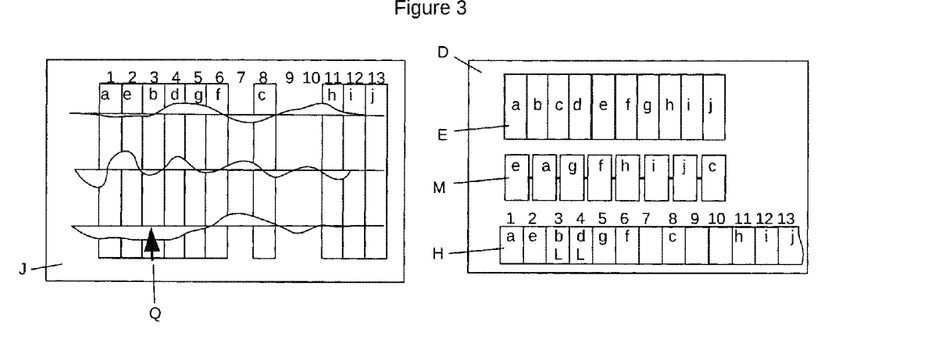

In the GUI views of FIGS. 2J and 3J, pages of data and their tables are seen during Playback and Recording. During those operations the run-marker Q is moving to the right and the Current and Next pages are the most critical so the Motion task locks those two pages. The Next page is loaded when the run-marker Q enters the left edge of each Current page, and the Next page is loaded long before the run-marker crosses the boundary from Current page to Next page. Thus, every page which will be needed by the run-marker is pre-loaded into memory by the Paging Task on a predicted, as-needed basis. The primary difference between FIG. 2 and FIG. 3 is that page "d" is loaded into time-slice 4 when the run-marker Q enters page "b".

The paging algorithm keeps pages loaded to the right and left of the active page. The first three pages "a", "e","b" in the GUI view 2J remain loaded to keep data in-memory during GUI editing operations such as curve-smoothing or bidirectional mouse dragging of the run-marker 2Q. Those operations can cross over from the current page into adjacent pages without stalling on a page-loading delay.

The page-tables 2H and 2M produce the changes of page data between FIG. 2 and FIG. 3. Originally, in the LRU 2M, Previous RAM pages "a" and "g" are the two pages which were most recently used. This changes when the run-marker 2Q crosses the boundary to the Next page. In FIG. 3 the LRU has changed priorities and statuses as follows:
"d" was the least-used available page in the queue 2M, "d" is used to fulfill the new page request. It is removed from the queue 3M because it becomes locked and unavailable.
"a,g,f,h,i,j,c" get shifted down in the queue 3M because they were not utilized.
"e" becomes unlocked and enters the top of the queue 3M, as it is newly available for re-use but most recently used.

New page requests are first fulfilled first from the bottom of the LRU queue M, then upward. Locked status prevents a page from being unloaded or re-used, thus any page which gets locked is removed from the LRU queue. In 2H and 3H the critical pages have an "L" flag denoting Locked status.

Figure 4:
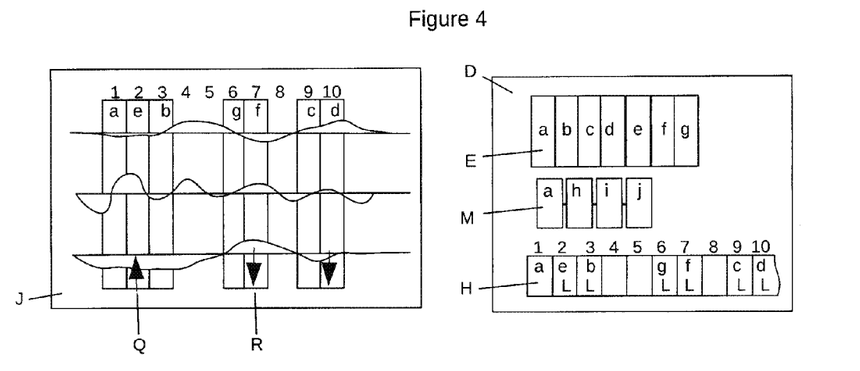

For data Copy operations, the paging algorithm loads and locks the two pages at the right of a copied region (FIG. 4 time-slices 9,10) and the two pages at the left of the region (FIG. 4 time-slices 6,7). The four pages (g,f,c,d) are necessary to prevent the algorithm from stalling while copying the section. The page-tables during a Copy operation have those four pages Locked as in-use, represented by the four "L" flags in page-table 4H. Also seen locked in FIG. 4H are the Current and Next pages surrounding the run-marker 4Q.

Figure 5:
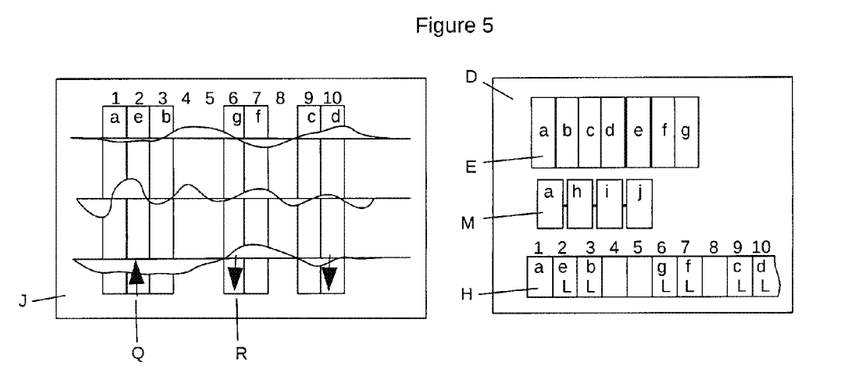
Figure 6:
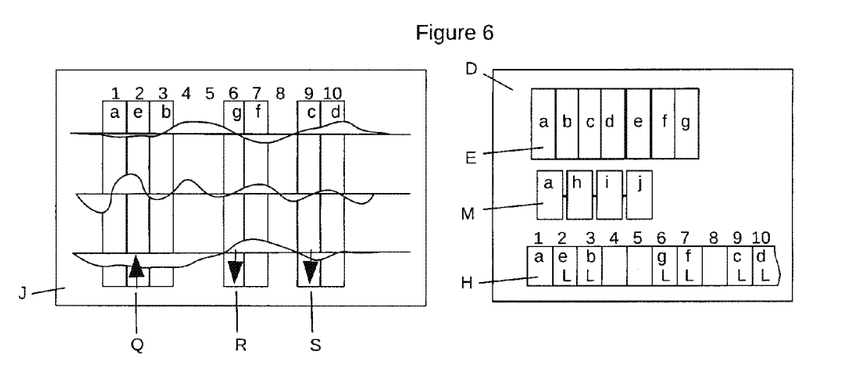

A Copy operation which inserts data, pushing old data rightward, most often crosses one page boundary at a time as represented by movement of the arrow R between FIG. 4 and FIG. 5. In FIG. 4, the source data is in pages "g,f" and the destination is in pages "c,d". During a Copy-and-Insert operation; where data is inserted as one point and old data is pushed to the right, the data pointers move leftward, as represented by the movement of arrow R between FIG. 4 and FIG. 5. The operation does not result in any re-prioritization of pages in the LRU queue and does not change nay Locked flags "L" in page-tables 4H and 5H.

Two pairs of pages are necessary during Copy operations because in some cases the length of the copied section can be divided evenly by the size of a page. In that case, both the source and destination of the copy would cross a page boundary and demand new pages simultaneously as in FIG. 6. If the two pages "g" and "c" were not available at once as the arrows 6R and 6S moved leftward, the algorithm might stall waiting for an available page to be swapped in from persistent storage.

In the case of an Insert operation the algorithm would copy data from the rightmost page of the left region to the rightmost page of the right region. Using FIG. 4, data from page 4f is first copied to page 4d, then data from page 4g is copied to page 4c. The left page of each pair 4g,4c insures that the next page of data is loaded when crossing page boundaries.

Figure 7:
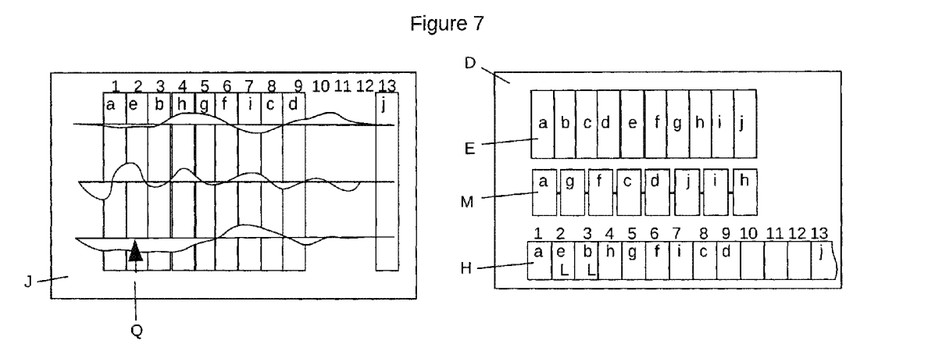
Figure 8:
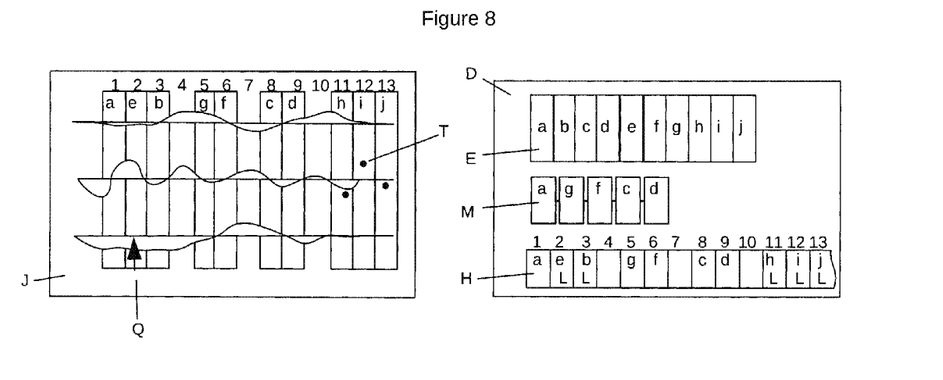

Paging changes due to a GUI editing operation are shown in FIGS. 7, 8. The user has asynchronously clicked on GUI time slice 12 with a "three-point smoothing tool" which is depicted in FIG. 8T as dots on pages 8h,8i,8j. The three point smoothing operation will draw a curve through the three points and the paging algorithm thus requires those pages to be swapped into RAM. On the LRU of 7M, pages "h","i","j" are available so they are locked and removed from the LRU queue in 8M. The data from pages "h" and "j" are first written to persistent storage; then those two pages are re-used by moving them to the curve smoothing area where data is copied from persistent storage to "h" and "i". Since the user clicked asynchronously on the GUI and the algorithm cannot know ahead of time where the user might click, in the case the curve smoothing operation stalled until two of three pages were moved. A Run operation at 8Q would not have been disturbed though, nor would a Copy operation on pages "g", "f","c","d" of FIG. 8 have been disturbed. In this way the ten pages of the preferred embodiment fulfill three simultaneous page usage cases without stalling the "Run" operation which plays and records data and is most critical.

Changes of loaded pages occur according to the following two rules:

1. When the run-marker crosses a page boundary, the next page in time is loaded.
2. When an asynchronous operation like a GUI mouse click requests a page; an unlocked page is removed from memory to supply the clicked region with a fresh page. "Removal" is comprised of copying the previous data content to persistent storage, reading the applicable data for the new page from persistent storage, and setting flags in shared memory page-tables to indicate that the new page is loaded.

When a new page is requested, the algorithm always tries to use pages starting from the bottom of the LRU queue. Because the algorithm always puts newly loaded pages at the top of the LRU and the others shift downward, less-used pages naturally shift to the bottom of the queue.

The swapped-in pages of the dataset provide a random-access area of data within which the GUI run-marker can immediately "jump" at any time with deterministic latency, and the Motion Task can output data from the run-marker destination within the space of one motion-control "frame". This is crucial in live-event and entertainment applications where external trigger switches are used to start and stop portions; e.g.: named regions, of the dataset.

In the preferred embodiment of the invention, the first time-slice of a dataset is given an in-RAM page. This allows the system to make the run-marker loop around from the end of the dataset back to the beginning without stalling. Additionally, this facilitates the generation of a known region incorporating the first frame of the first page which can be triggered spontaneously by an external device or command.

In the preferred embodiment of the invention, each page is 30 seconds long, such that the total amount of time represented by the ten page in-memory dataset is three hundred seconds. This duration is dependent on the motion Task consuming data at the same rate it was recorded, though the Motion Task can be configured to consume data at different speeds and frame rates. Other embodiments of the invention could utilize different page durations. Other embodiments of the invention may omit this preventative measure.

In the current embodiment of the invention, the data page-table itself is accessed with an unsigned 64 bit index yielding a total possible dataset length of 30 seconds$\times((2^{64})-1)$ or 17.5 trillion years of data, provided hot-swappable persistent storage is provided.

The preferred embodiment the invention contains ten loaded pages at all times, in other embodiments more pages could be loaded at once to make more random access data available at once.

Figure 9:
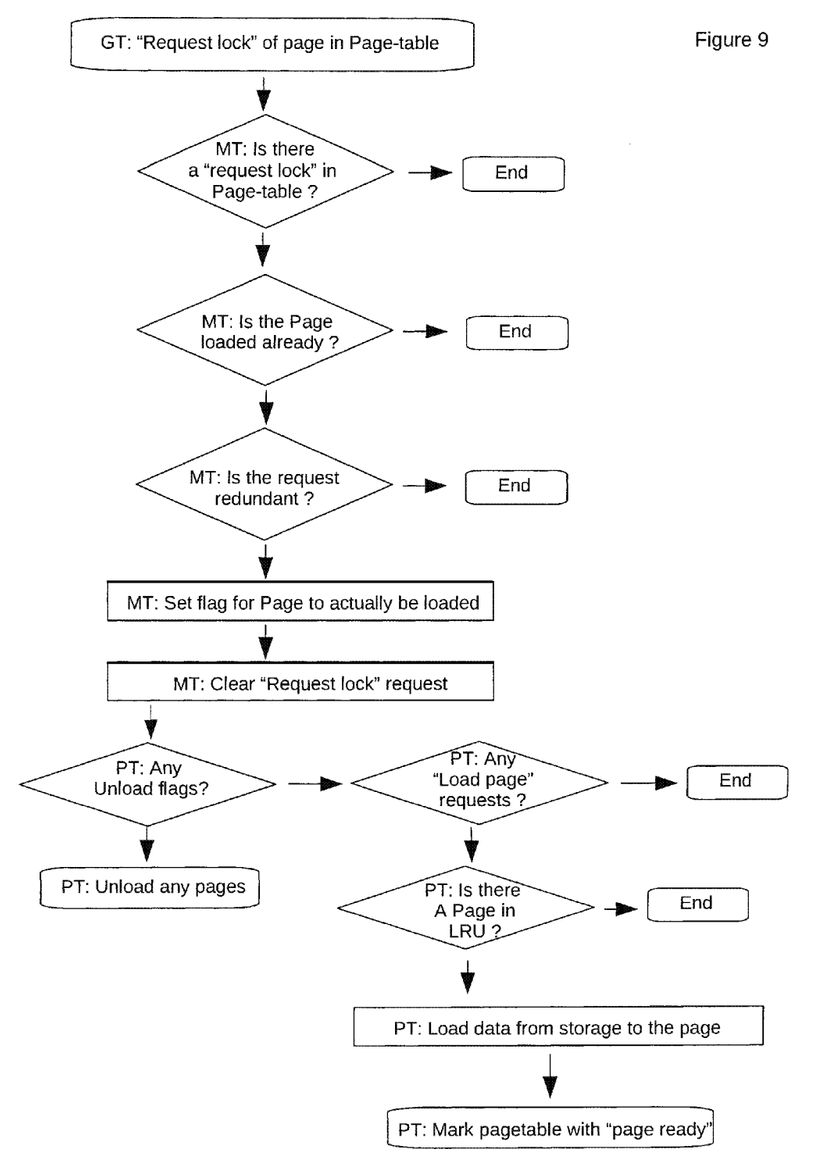
FIG. 9 is a flow chart depicting the procedure followed by the invention as it loads and unloads pages based on requests.

The flowchart in FIG. 9 demonstrates how pages get loaded as the run-marker progresses through the dataset during a capture or playback.

"GT:" precedes operations performed by the Graphical User Interface Task.

"MT:" precedes operations performed by the deterministic real time Motion Task.

"PT:" precedes operations performed by the soft real time Paging Task.

The GUI requests that a page be loaded, by incrementing the flag "request_lock" in the page-table structure of a given page The hard real time Motion Task polls the page-table and finds the nonzero "request_lock" variable The Motion task checks to see if the requested page is already loaded, if so it exits the operation. If not, the request is verified not to be a redundant request, if not, the Motion task sets a flag in the proper page-table element to "LOAD_MEM_PAGE_REQUEST".

The motion task resets the "request_lock" back to zero to clear the load request.

The soft real time Paging Task searches the page-tables and first unloads any pages to persistent storage that are flagged with "UNLOAD_MEM_PAGE_REQUEST"

The soft real time Paging Task searches the page-tables and if it finds any pages with the flag "LOAD_MEM_PAGE_REQUEST" it starts looking for available pages The soft real time Paging Task checks from the bottom of the LRU for available pages. If one is available it is used.

The soft real time Paging Task loads data from persistent storage into the newly found page in RAM The soft real time Paging Task sets the page-table variable "value" to the number of the RAM page used, signifying that the page is ready for use.

Paging requests can be made by the Motion Task or by soft real time tasks like the GUI via a flag which is read by the Paging Task. Other critical paging flags are managed by the hard real time Motion task to prevent preemption and race conditions between tasks. The actual moving of data is done by the soft real time Paging Task which has access to persistent storage, and which has adequate time to read and write storage because of the significant length of a page. In the preferred embodiment of the invention each data page contains thirty seconds of data, and the Paging task can be expected to load or save such a quantity of data within a variable period of time that averages less than three seconds. Thus the preferred embodiment of the system is tolerant of a ten times margin of error in Paging Task timing.

While the invention has been described herein with reference to certain preferred embodiments, those embodiments have been presented by way of, example only, and not to limit the scope of the invention. Additional embodiments thereof will be obvious to those skilled in the art having the benefit of this detailed description. Further, modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. A system maintained in a computer for capturing and streaming live motion datasets with deterministic timing, comprised of:

a series of in-memory data Pages within which a point of data playback or a point of data capture can seek with deterministic timing;

a shared memory area which both deterministic real time and non real time tasks can access;

a linear Page Table in the shared memory area with one element per time-slice, where a plurality of Flags in the Page Table convey memory-swapping requests and statuses;

a prioritized Page Queue in the shared memory area utilizing the mechanism of a linked list to connect elements of the Page Table in a Least-Recently-Used order;

a persistent mass storage device with a hot-swappable physical media to which data is stored in fixed size Pages;

a deterministically scheduled software Motion Task which takes live input of a plurality of digitized channels of motion and outputs the plurality of digitized channels of motion in a communications stream;

a non-deterministically scheduled and non-preemptible software Paging Task which manipulates blocks of data as Pages, moving data between the shared memory area and the persistent memory storage so as to pre-fetch data before it is needed by the Motion Task; and a non-deterministically software Graphical Task which requests blocks of the in-memory data Pages and portrays a motion time-line and allows a user to capture or play back multiple channels of motion.

2. The system as recited in claim 1 wherein the Motion Task manages requests for blocks of the in-memory data Pages without the possibility of being pre-empted by another process.

3. The method as recited in claim 1 wherein each Page Table element represents tens of seconds worth of data and data is swapped out to the persistent storage in pages indexed by a 64 bit number so as to remove practical limitations on the length of the dataset; and the data on the persistent mass storage device is indexed by a 64 bit number such that there is no practical limitation on the length of the dataset.

4. The system as recited in claim 1 wherein the Paging Task moves data to and from the persistent storage within a sufficient time frame such that it allows deterministic and uninterrupted data flow through the Motion Task.

5. The system as recited in claim 1 wherein graphical dataset editing operations are conducted on the in-memory pages such that data access during editing normally does not have to wait on the in-memory pages to be loaded from the persistent storage.

6. The system as recited in claim 1 wherein the Motion Task is presented with a continuous dataset accessed via a small, fixed memory area, achieving deterministic multichannel data streaming effectively unlimited by the size of system memory.

7. The system as recited in claim 1 wherein a means for keeping data in-memory contains ten loaded pages at all times of which three pages are for a current, a next, and a previous data buffer, four pages are for block data copies, two of said four pages being for beginning of a copied section and two of said four pages being for the end of the copied section, and three pages are for editing operations.

8. The system as recited in claim 1 wherein the system is capable of being electrically synchronized to an external pacing signal so as to stay in step with other equipment.

9. The system as recited in claim 1 wherein non-motion data can be streamed into the system, captured, and streamed out of the system.

10. The system as recited in claim 1 wherein motion is streamed deterministically to or from a second computer where the data can be either captured or displayed graphically.

11. The method as recited in claim 1 wherein the shared memory area is stored in random access memory and the computer displays a limited quantity of a low-resolution version of swapped-out data so as to represent said swapped-out data graphically to the user.

* * * * *